United States Patent
Ina et al.

(10) Patent No.: US 6,957,112 B2
(45) Date of Patent: Oct. 18, 2005

(54) INDUSTRIAL MACHINE MANAGEMENT SYSTEM AND METHOD

(75) Inventors: Hideki Ina, Kanagawa (JP); Nobuaki Ogushi, Tochigi (JP); Masaya Ogura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 764 days.

(21) Appl. No.: 09/988,875

(22) Filed: Nov. 21, 2001

(65) Prior Publication Data

US 2002/0065572 A1    May 30, 2002

(30) Foreign Application Priority Data

Nov. 27, 2000    (JP) .............................. 2000-360205

(51) Int. Cl.⁷ ............................................ G06F 19/00
(52) U.S. Cl. ........................... 700/96; 700/121; 700/19
(58) Field of Search ............................. 700/19, 96, 121

(56) References Cited

U.S. PATENT DOCUMENTS 4,827,423 A * 5/1989 Beasley et al. ............... 700/96
5,231,585 A * 7/1993 Kobayashi et al. ........... 700/96
6,094,600 A * 7/2000 Sharpe et al. ................. 700/19

FOREIGN PATENT DOCUMENTS

EP    0822473 A2    2/1998
JP    11015520      1/1999

* cited by examiner

*Primary Examiner*—Anthody Knight
*Assistant Examiner*—Michael B. Holmes
(74) *Attorney, Agent, or Firm*—Fitzpatrick, Cella, Harper & Scinto

(57) ABSTRACT

A system for quickly and easily optimizing the parameters of an industrial machine or solving any trouble in industrial machine is provided. A factory (100) and vendor (200) are connected through a data communication network (300). A management apparatus (120) selectively gives the operation right of an industrial machine (110) to a factory-side operation apparatus (130) or a vendor-side operation apparatus (210) arranged at a remote site. The operation apparatus having the given operation right can operate the industrial machine (110) and obtain information representing the operation condition of the industrial machine.

10 Claims, 4 Drawing Sheets

INDUSTRIAL MACHINE MANAGEMENT SYSTEM AND METHOD

FIELD OF THE INVENTION

The present invention relates to a management system and method for managing an industrial machine.

BACKGROUND OF THE INVENTION

Projection exposure apparatuses for manufacturing semiconductor devices are required to be able to project and expose a circuit pattern on a reticle surface onto a wafer surface at higher resolving power as circuits are becoming micropatterned and have higher densities. Circuit projecting and resolving power depends on the numerical aperture (NA) and exposure wavelength of a projection optical system. Hence, to improve the resolving power, a method of increasing the NA of the projecting optical system or a method of shortening the exposure wavelength is employed. For the latter method, the exposure light source has changed from g-line to i-line and is changing from the i-line to an excimer laser now. For the excimer laser, exposure apparatuses that use an oscillation wavelength of 248 or 193 nm have already been put into practical use. Currently, a next-generation exposure apparatus with an oscillation wavelength of 157 nm has been examined.

As the micropatterning of circuits progresses, a reticle having a circuit pattern formed thereon and a wafer on which the circuit pattern is projected must be accurately aligned. The required accuracy is ⅓ the circuit line width. For example, in the current 180-nm design, the required accuracy is ⅓, i.e., 60 nm.

In addition, a variety of device structures have been proposed, and their production has been examined. As the use of personal computers and the like are widespread, the tractor of micropatterning has shifted from memories represented by DRAMs to CPU chips. Along with further growth in IT, development of devices for commutation systems called home wireless LANs or Bluetooth and MMICs (Millimeter-wave Monolithic Integrated Circuits) used in ITSs (Intelligent Transport Systems) represented by an automobile radar using a frequency of 77 GHz or LMDSs (Local Multipoint Distribution Services) using a frequency of 24 to 38 GHz would encourage further micropatterning.

There are also various semiconductor device manufacturing processes. As a planarizing technique for solving a shortage in depth of an exposure apparatus, the W-CMP (Tungsten Chemical Mechanical Polishing) process is already becoming a thing of the past technique. Currently, a Cu dual damascene process has received a great deal of attention.

Semiconductor devices also employ various structures and materials. For example, a P-HEMT (Pseudomorphic High Electron Mobility Transistor) formed by combining compounds such as GaAs and InP, M-HEMT (Metamorphic-HEMT), and HBT (Heterojunction Bipolar Transistor) using SiGe or SiGeC have been proposed.

In the current circumstances of the semiconductor industry, the number of parameters to be optimized in a semiconductor manufacturing apparatus such as an exposure apparatus is enormous. In addition, these parameters are not independent but are closely related to each other.

Conventionally, a person in charge of apparatus introduction in each device manufacturer determines the parameters by trial and error. A very long time is required to determine optimum parameters. Even after parameter determination, if, e.g., a process error occurs, the manufacturing process may be changed in accordance with the error, and the parameters of the manufacturing apparatus may also have to be changed again. It is also time-consuming.

In production of semiconductor devices, time to be taken from the setup of a manufacturing apparatus to the start of mass production is limited. Time taken to determine parameters is also limited. From the viewpoint of COO (Cost Of Ownership) as well, the operation time of the manufacturing apparatus must be increased, and therefore, the parameters that are determined once must be quickly changed. In such a situation, it is very difficult to manufacture various semiconductor devices with optimum parameters. Even a manufacturing apparatus capable of obtaining high yield cannot obtain the expected yield because it is used without optimizing the parameters, resulting in an unnoticeable decrease in yield. Such a decrease in yield increases the manufacturing cost and decreases the delivery amount, and additionally, decreases the competitive power.

The parameters of a manufacturing apparatus can be quickly determined probably not by the user of the manufacturing apparatus but by a person in charge of manufacturing, sales, or maintenance of the manufacturing apparatus or a person in charge of services about the manufacturing apparatus (such a person will be referred to as a vendor hereinafter). This is because the vendor knows the characteristics of the manufacturing apparatus better and has information that is not public to the user. However, from the viewpoint of schedule adjustment and transmit time, it is not always the best to make the vendor actually visit the factory where the manufacturing apparatus is installed.

For a successful semiconductor business, it is very important to solve any trouble in manufacturing apparatus. Japanese Patent Laid-Open No. 11-15520 has proposed an epoch-making system that quickly solves any trouble in industrial machine such as a semiconductor manufacturing apparatus from a remote site. In this system, a monitoring apparatus for monitoring the operation state of an industrial machine and a management apparatus on a vendor side are connected through a data communication network such as the Internet, thereby maintaining the industrial machine while exchanging information related to the maintenance of the industrial machine therebetween.

SUMMARY OF THE INVENTION

It is an object of the present invention to provide an advanced system of the above-described maintenance system. More specifically, it is an object of the present invention to provide a system and method capable of quickly and easily optimizing the parameters of an industrial machine or solving any trouble in industrial machine.

According to the first aspect of the present invention, there is provided a management system for managing an industrial machine using a data communication network, comprising a management apparatus for selectively giving an operation right of the industrial machine to one of a first operation apparatus arranged in a factory where the industrial machine is installed and a second operation apparatus arranged at a remote site from the factory where the industrial machine is installed, and a control apparatus for operating the industrial machine in accordance with an instruction from the operation apparatus to which the operation right has been given by the management apparatus and providing information representing an operation condition of the industrial machine to the operation apparatus.

According to the preferred aspect of the present invention, the second operation apparatus and the control apparatus are preferably connected through the data communication network.

According to the preferred aspect of the present invention, the management apparatus preferably selectively gives the operation right of the industrial machine to one of the first and second operation apparatuses in accordance with an instruction from a manager of the industrial machine.

According to the preferred aspect of the present invention, preferably, the system further comprises a manager setting section for setting the manager of the industrial machine, and the management apparatus selectively gives the operation right of the industrial machine to one of the first and second operation apparatuses in accordance with an instruction from the manager set by the manager setting section.

According to the preferred aspect of the present invention, the system preferably further comprises a limiting section for limiting contents of operation of the industrial machine by the first operation apparatus through the control apparatus when the manager of the industrial machine is a manager of the second operation apparatus.

According to the preferred aspect of the present invention, the system preferably further comprises a limiting section for limiting contents of operation of the industrial machine by the second operation apparatus through the control apparatus when the manager of the industrial machine is a manager of the first operation apparatus.

According to the preferred aspect of the present invention, the system preferably further comprises a security system for making information related to the operation of the industrial machine by the first operation apparatus secret to the second operation apparatus and making information related to the operation of the industrial machine by the second operation apparatus secret to the first operation apparatus.

According to the preferred aspect of the present invention, preferably, the security system makes some or all pieces of information, which are secret to the second operation apparatus, public to the second operation apparatus in accordance with an instruction from the first operation apparatus and makes some or all pieces of information, which are secret to the first operation apparatus, public to the first operation apparatus in accordance with an instruction from the second operation apparatus.

According to the preferred aspect of the present invention, preferably, when the operation right of the industrial machine is given to the first operation apparatus, the security system makes the information representing the operation condition of the industrial machine public to the second operation apparatus in accordance with an instruction from the first operation apparatus, and when the operation right of the industrial machine is given to the second operation apparatus, the security system makes the information representing the operation condition of the industrial machine public to the first operation apparatus in accordance with an instruction from the second operation apparatus.

According to the preferred aspect of the present invention, the second operation apparatus is preferably arranged in a business office of a person in charge of manufacturing, sales, or maintenance of the industrial machine or a person in charge of services about the industrial machine.

According to the preferred aspect of the present invention, the industrial machine preferably comprises a semiconductor manufacturing apparatus such as an exposure apparatus, CVD apparatus, etching apparatus, CMP apparatus, resist coating apparatus, development apparatus, ashing apparatus, or inspection apparatus.

According to the second aspect of the present invention, there is provided a management method of managing an industrial machine using a data communication network, comprising the management step of selectively giving an operation right of the industrial machine to one of a first operation apparatus arranged in a factory where the industrial machine is installed and a second operation apparatus arranged at a remote site from the factory where the industrial machine is installed, and the control step of sending an instruction from the operation apparatus to which the operation right has been given in the management step to a control apparatus of the industrial machine to cause the control apparatus to control the industrial machine and sending information representing an operation condition of the industrial machine from the control apparatus to the operation apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

The preferred embodiment of the present invention will be described below with reference to the accompanying drawings.

Figure 1:
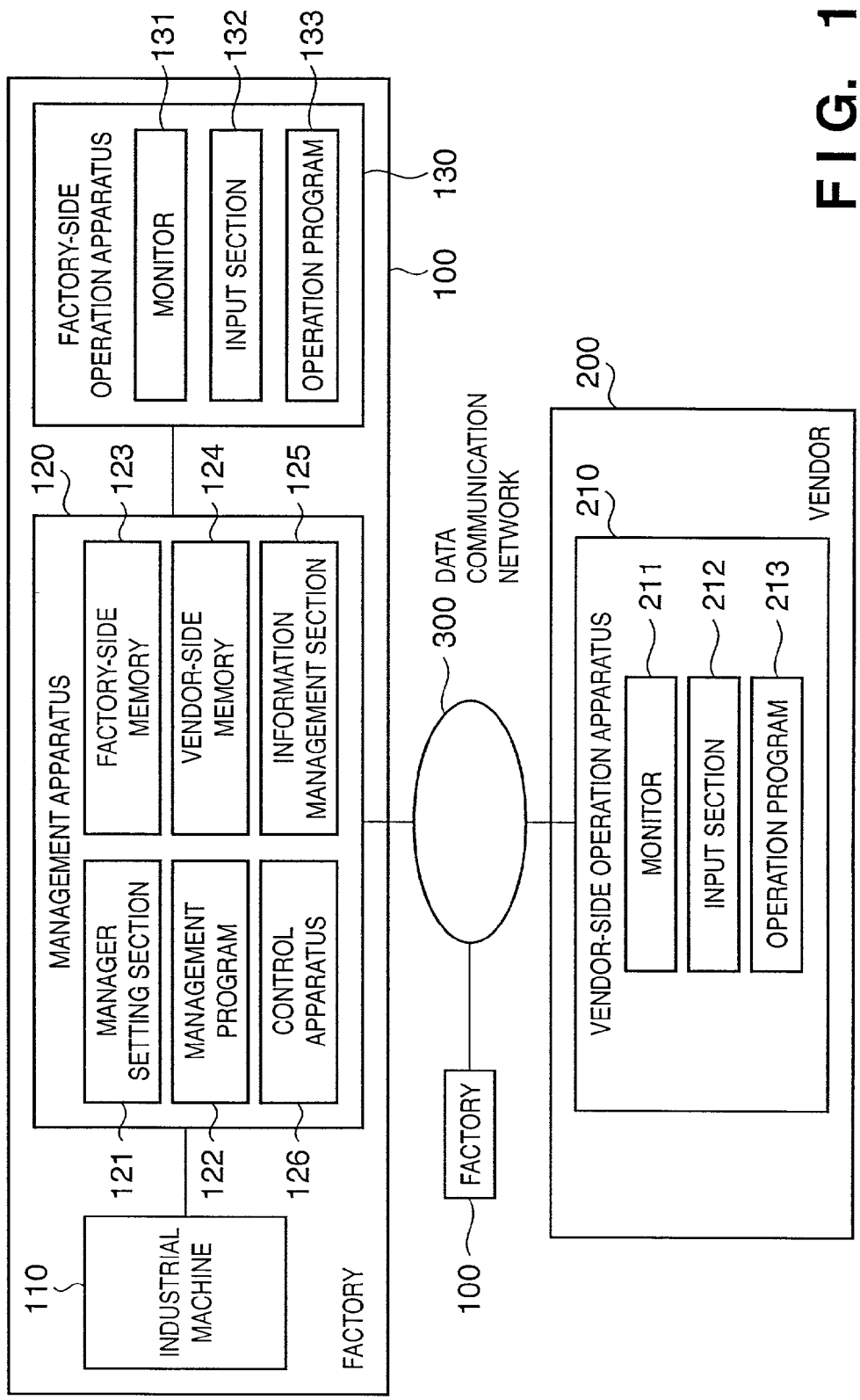
FIG. 1 is a block diagram showing the configuration of an industrial machine management system according to a preferred embodiment of the present invention.

FIG. 1 is a block diagram showing the configuration of an industrial machine management system according to the preferred embodiment of the present invention. This management system can be formed typically by connecting one or a plurality of factories 100 to a vendor 200 located at a remote site from the factories 100 through a data communication network 300 such as the Internet or a dedicated line.

In each factory 100, an industrial machine 110, a management apparatus 120 for managing the industrial machine, and a factory-side operation apparatus (first operation apparatus) 130 for operating the industrial machine 110 through the management apparatus 120 are installed. Examples of the industrial machines 110 to be managed are semiconductor manufacturing apparatuses such as an exposure apparatus, CVD apparatus, etching apparatus, CMP apparatus, resist coating apparatus, development apparatus, ashing apparatus, and inspection apparatus.

The factory-side operation apparatus 130 can operate the industrial machine 110 through the management apparatus 120. Some or all of the industrial machine 110, management apparatus 120, and factory-side operation apparatus 130 may be integrated. The factory-side operation apparatus 130 typically includes a monitor 131 for monitoring various operation states of the industrial machine 110 or checking parameters, an input section 132 for inputting information (e.g., parameters, commands, and programs) to be used to operate the industrial machine 110, and an operation program 133 for controlling the operation of the factory-side operation apparatus 130.

A vendor-side operation apparatus (second operation apparatus) 210 is installed in the business office of the vendor 200 located at a remote site from the factories 100. The vendor-side operation apparatus 210 is connected to the management apparatus 120 in the factory 100 through the data communication network 300 so that the apparatus 200 can operate the industrial machine 110 from the remote site through the management apparatus 120 and obtain information representing the operation state. Hence, the vendor 200 can, e.g., optimize the parameters of the industrial machine 110 while repeating operation of changing the parameters of the industrial machine 110 and checking the operation state of the industrial machine 110 or check the symptoms of a trouble in industrial machine 110 or solve the trouble while operating the industrial machine 110. Communication using the data communication network 300 complies with, e.g., the packet communication protocol (TCP/IP).

In optimizing the parameters or solving a trouble, the vendor 200 can effectively use various kinds of know-how of its own, the design data of the industrial machine 110, and the like. To the contrary, it is very difficult for a person who does not know the characteristics of the industrial machine 110 well, e.g., a person in charge on the factory 100 side to optimize the parameters and to solve a trouble while operating the industrial machine 110, as in the prior art, and even if it is possible, a very long time is required. In addition, from the viewpoint of schedule adjustment and transmit time, it is not speedy to allow a person in charge on the vendor 200 side to visit the factory 100 each time to perform the above operation. As is apparent from the above description, when the industrial machine 110 is a semiconductor manufacturing apparatus such as an exposure apparatus, the advantage of this management system becomes more conspicuous.

The vendor-side operation apparatus 210 typically includes a monitor 211 for monitoring various operation states of the industrial machine 110 or checking parameters, an input section 212 for inputting information (e.g., parameters, commands, and programs) to be used to operate the industrial machine 110, and an operation program 213 for controlling the operation of the vendor-side operation apparatus 210.

The management apparatus 120 includes a manager setting section 121 for setting the manager of the industrial machine 110, a management program 122 for controlling the management system, a factory-side memory 123 to be exclusively used by the factory 100 side, a vendor-side memory 124 to be exclusively used by the vendor 200 side, an information management section 125 for controlling an access to the factory-side memory 123 and vendor-side memory 124, and a control apparatus 126 for operating the industrial machine 110 in accordance with an instruction from the factory-side operation apparatus 130 or vendor-side operation apparatus 210 and providing information representing the operation condition to the factory-side operation apparatus 130 or vendor-side operation apparatus 210.

The manager setting section 121 can set the manager, e.g., in accordance with mechanical operation on switches or buttons, on the basis of information (e.g., a special code) sent from the factory-side operation apparatus 130, vendor-side operation apparatus 210, or another terminal, or in accordance with another method. Typically, before the industrial machine 110 is installed in the factory 100 by the vendor 200, and acceptance inspection and the like are done by a person in charge in the factory 100, the industrial machine 110 is managed by the vendor 200. After that, the industrial machine 110 is managed by the factory 100. The management program 122 selectively gives the operation right of the industrial machine 110 to the factory-side operation apparatus 130 or vendor-side operation apparatus 210 and allows the operation apparatus having the operation right to operate the industrial machine 110. The operation right of the industrial machine 110 is given to an appropriate operation apparatus typically in accordance with an instruction from the manager set by the manager setting section 121 or a permission from the manager.

The factory-side memory 123 is used to, e.g., store, of various kinds of information such as the operation log of the industrial machine 110 or the parameters set for the industrial machine 110 on the factory 100 side, information that must be secret to the vendor 200 side. The information management section 125 normally inhibits the vendor 200 side (i.e., the vendor-side operation apparatus 210) from accessing the factory-side memory 123 but permits the vendor 200 side to access some or all pieces of information stored in the factory-side memory 123 in accordance with a permission given from the factory 100 side.

The vendor-side memory 124 is used to, e.g., store, of various kinds of information such as the operation log of the industrial machine 110 or the parameters set for the industrial machine 110 on the vendor 200 side, information that must be secret to the factory 100 side. The information management section 125 normally inhibits the factory 100 side (i.e., the factory-side operation apparatus 130) from accessing the vendor-side memory 124 but permits the factory 100 side to access some or all pieces of information stored in the vendor-side memory 124 in accordance with a permission given from the vendor 200 side as needed.

Figure 2:
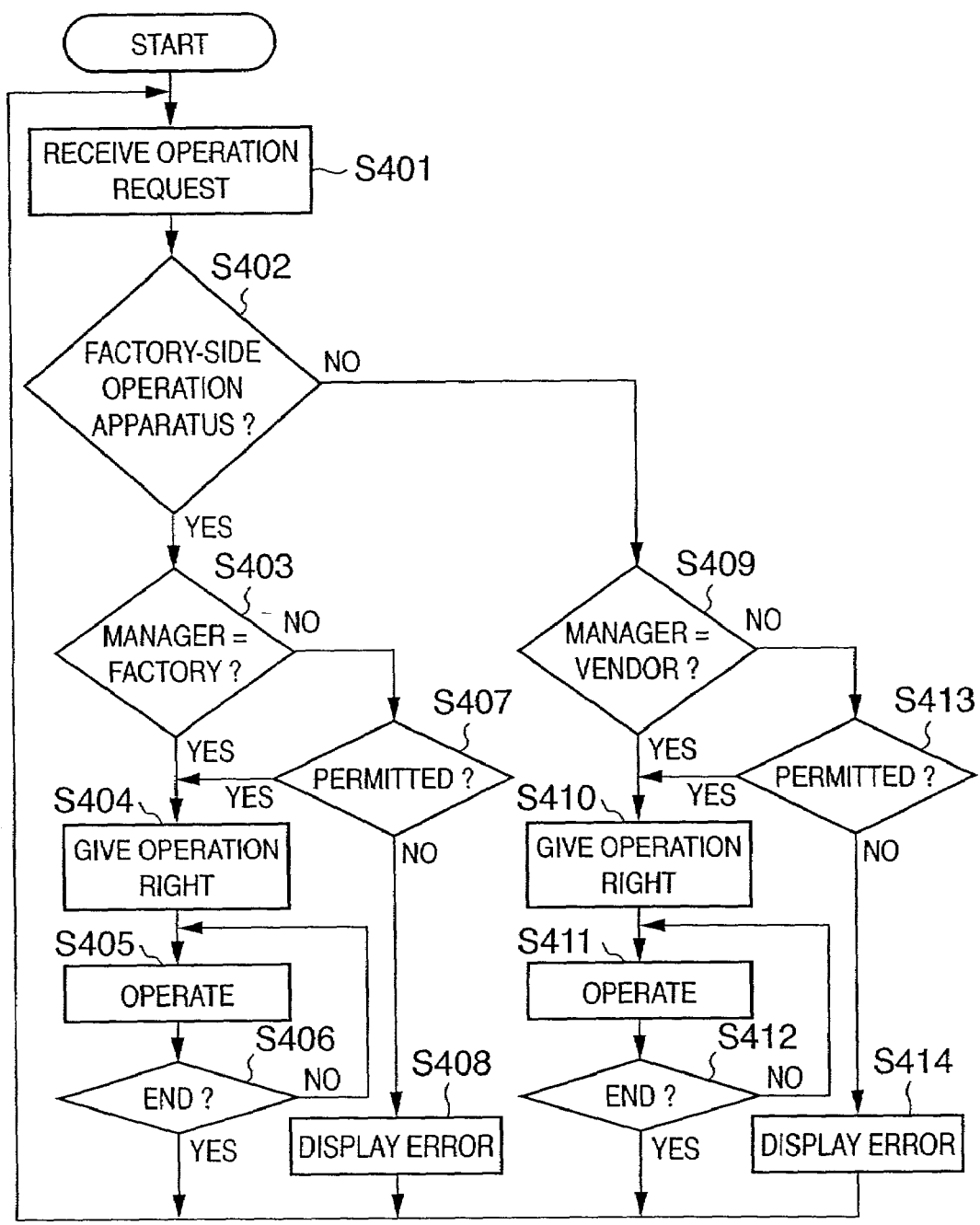
FIG. 2 is a flow chart showing the operation of a management apparatus based on a management program.

FIG. 2 is a flow chart showing the operation of the management apparatus 120 based on the management program 122. In step S401, the management apparatus 120 receives an operation request of the industrial machine 110 from the factory-side operation apparatus 130 or vendor-side operation apparatus 210. In step S402, the management apparatus 120 determines whether the factory-side operation apparatus 130 has issued the operation request. If YES in step S402, the flow advances to step S403. Otherwise, the flow advances to step S409.

In step S403, it is determined whether the current manager of the industrial machine 110, i.e., the manager set by the manager setting section 121 is on the factory 100 side. If YES in step S403, the flow advances to step S404. Otherwise (i.e., if the manager is on the vendor 200 side), the flow advances to step S407.

If YES in step S403, it means that the manager himself/herself is requesting the operation of the industrial machine 110. Hence, in step S404, the management apparatus 120 gives the operation right of the industrial machine 110 to the factory-side operation apparatus 130 related to the operation request. In step S405, the management apparatus 120 causes the control apparatus 126 to operate the industrial machine 110 in accordance with an instruction from the factory-side operation apparatus 130 and also acquires information representing the operation condition of the industrial machine 110 from the industrial machine 110 and transmits the information to the factory-side operation apparatus 130. The factory-side operation apparatus 130 displays the operation condition of the industrial machine 110 on, e.g., the monitor 131 in accordance with the information.

The management apparatus 120 may transmit the information representing the operation condition of the industrial machine 110 that is being operated by the factory-side operation apparatus 130 to the vendor-side operation apparatus 210 in accordance with an instruction from the factory-side operation apparatus 130.

In step S406, it is determined whether the operation of the industrial machine 110 by the factory-side operation apparatus 130 is to be ended (e.g., whether a command indicating the end of the operation has been received). If YES in step S406, the flow returns to step S401.

If it is determined in step S403 that the current manager of the industrial machine is on the vendor 200 side, the management apparatus 120 determines in step S407 whether the vendor 200 side will permit the operation of the industrial machine 110 by the factory 100 side. If YES in step S407, the flow advances to step S404 described above. If NO in step S407, the flow advances to step S408, and the management apparatus 120 causes the monitor 131 of the factory-side operation apparatus 130 to display an error message. In permitting the factory 100 side to operate the industrial machine 110, the vendor 200 side can limit the contents (e.g., commands) of operation of the industrial machine 110 by the factory-side operation apparatus 130.

If it is determined in step S402 that the operation request is issued from the vendor-side operation apparatus 210, the management apparatus 120 determines in step S409 whether the current manager of the industrial machine 110, i.e., the manager set by the manager setting section 121 is on the vendor 200 side. If YES in step S409, the flow advances to step S410. If NO in step S409 (i.e., if the manager is on the factory 100 side), the flow advances to step S413.

If YES in step S409, it means that the manager himself/herself is requesting the operation of the industrial machine 110. Hence, in step S410, the management apparatus 120 gives the operation right of the industrial machine 110 to the vendor-side operation apparatus 210 related to the operation request. In step S411, the management apparatus 120 causes the control apparatus 126 to operate the industrial machine 110 in accordance with an instruction from the vendor-side operation apparatus 210 and also acquires information representing the operation condition of the industrial machine 110 from the industrial machine 110 and transmits the information to the vendor-side operation apparatus 210. The vendor-side operation apparatus 210 displays the operation condition of the industrial machine 110 on, e.g., the monitor 211 in accordance with the information.

The management apparatus 120 may transmit the information representing the operation condition of the industrial machine 110 that is being operated by the vendor-side operation apparatus 210 to the factory-side operation apparatus 130 in accordance with an instruction from the vendor-side operation apparatus 210.

In step S412, it is determined whether the operation of the industrial machine 110 by the vendor-side operation apparatus 210 is to be ended (e.g., whether a command indicating the end of the operation has been received). If YES in step S412, the flow returns to step S401.

If it is determined in step S409 that the current manager of the industrial machine is on the factory 100 side, the management apparatus 120 determines in step S413 whether the factory 100 side will permit the operation of the industrial machine 110 by the vendor 200 side. If YES in step S413, the flow advances to step S410 described above. If NO in step S413, the flow advances to step S414, and the management apparatus 120 causes the monitor 211 of the vendor-side operation apparatus 210 to display an error message. In permitting the vendor 200 side to operate the industrial machine 110, the factory 100 side can limit the contents (e.g., commands) of operation of the industrial machine 110 by the vendor-side operation apparatus 210.

Figure 3:
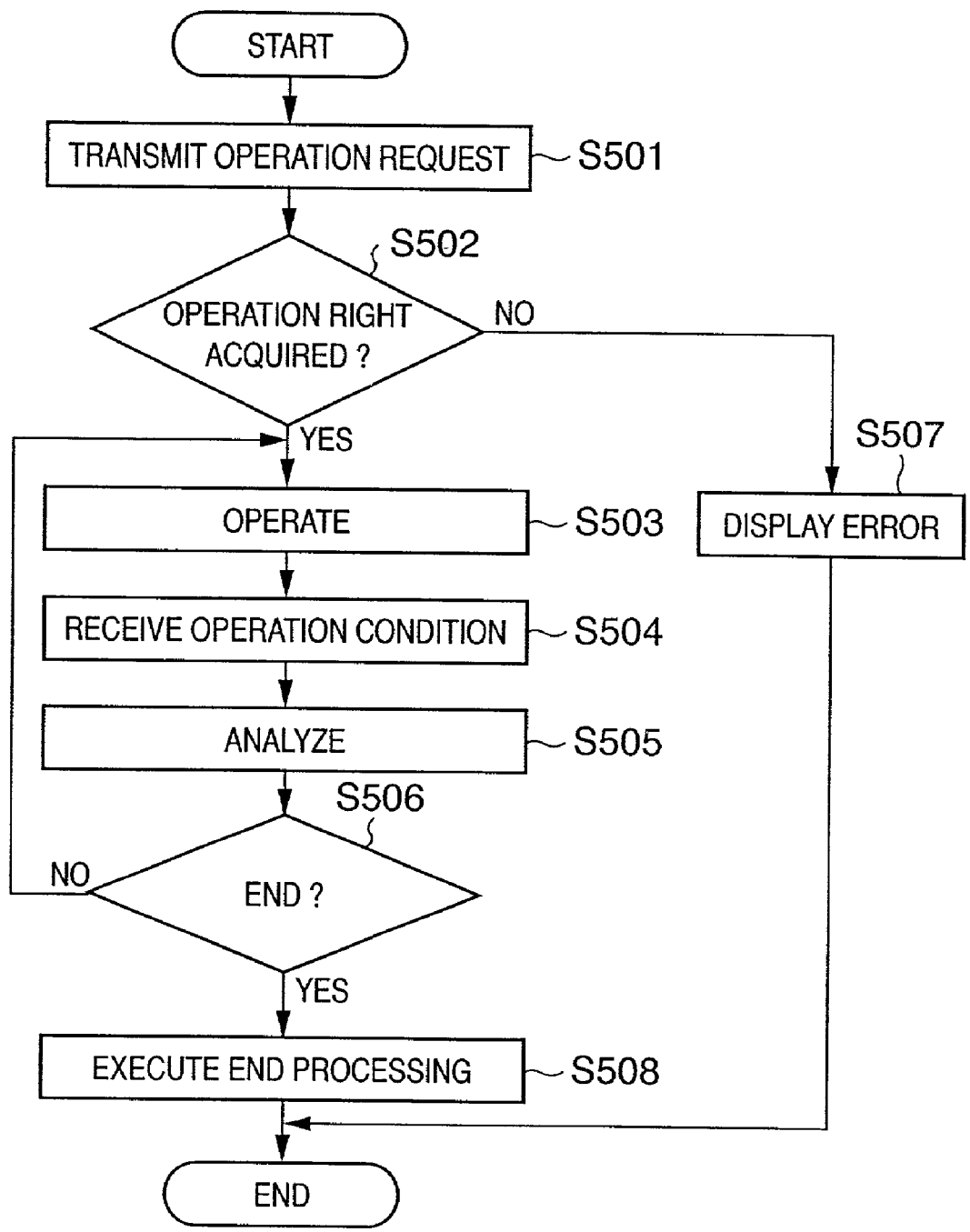
FIG. 3 is a flow chart showing the operation of a vendor-side operation apparatus based on an operation program.

FIG. 3 is a flow chart showing the operation of the vendor-side operation apparatus 210 based on the operation program 213. In step S501, the vendor-side operation apparatus 210 transmits the operation request of the industrial machine 110 to the management apparatus 120 through the data communication network 300 in accordance with the operation on the input section 212 by a person in charge on the vendor 200 side (corresponding to step S401).

In step S502, the vendor-side operation apparatus 210 determines whether the operation right of the industrial machine 110 has been given by the management apparatus 120. If YES in step S502 (corresponding to step S404), the flow advances to step S503. If NO in step S502 (corresponding to "NO" in step S407), the flow advances to step S507 to display an error message on the monitor 211 (corresponding to step S408).

In step S503, the vendor-side operation apparatus 210 outputs an instruction to the management apparatus 120 through the data communication network 300 to operate the industrial machine 110 in accordance with the operation on the input section 212 by the person in charge on the vendor 200 side (corresponding to step S405). In step S504, the vendor-side operation apparatus 210 receives information representing the operation condition of the industrial machine 110 from the management apparatus 120 through the data communication network 300 (corresponding to step S405).

In step S505, the vendor-side operation apparatus 210 analyzes the information received from the management apparatus 120 and outputs the result to the monitor 211 or the like.

In step S506, it is determined whether the operation of the industrial machine 110 is to be ended. If YES in step S506, the flow advances to step S508 to execute end processing (e.g., a command indicating the end of the operation is transmitted to the management apparatus 120).

Figure 4:
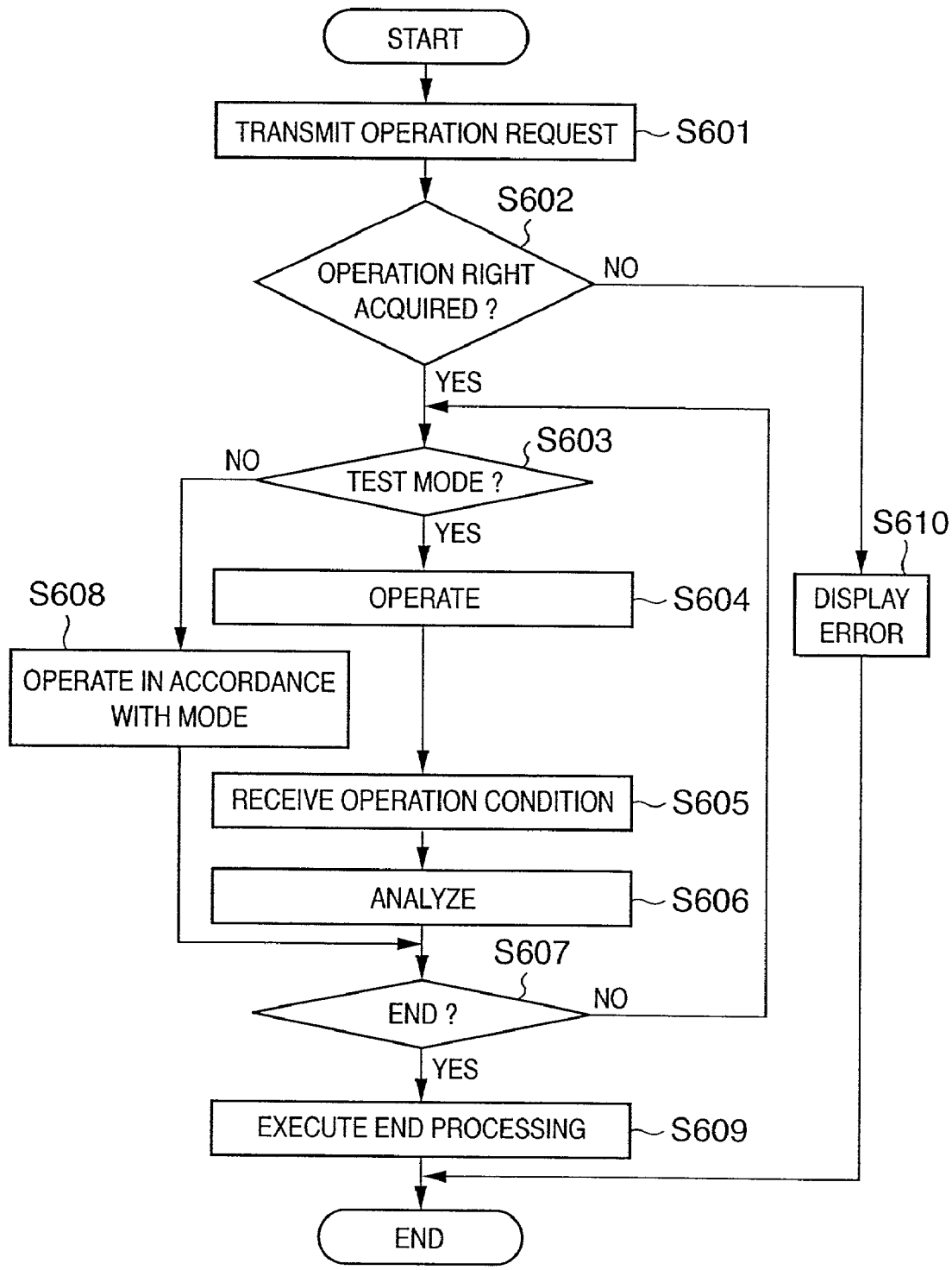
FIG. 4 is a flow chart showing the operation of a factory-side operation apparatus based on an operation program.

FIG. 4 is a flow chart showing the operation of the factory-side operation apparatus 130 based on the operation program 133. In step S601, the factory-side operation apparatus 130 transmits the operation request of the industrial machine 110 to the management apparatus 120 in accordance with the operation on the input section 132 by a person in charge on the factory 100 side (corresponding to step S401).

In step S602, the factory-side operation apparatus 130 determines whether the operation right of the industrial machine 110 has been given by the management apparatus 120. If YES in step S602 (corresponding to step S410), the flow advances to step S603. If NO in step S602 (corresponding to "NO" in step S413), the flow advances to step S610 to display an error message on the monitor 131 (corresponding to step S414).

In step S603, the factory-side operation apparatus 130 determines whether the industrial machine 110 is to be operated in the test mode. If YES in step S603, the flow advances to step S604. If the industrial machine 110 is to be operated in another mode (e.g., mass production mode), the flow advances to step S608 to operate the industrial machine 110 in accordance with that mode.

In step S604, the factory-side operation apparatus 130 outputs an instruction to the management apparatus 120 through to operate the industrial machine 110 in accordance with the operation on the input section 132 by the person in charge on the factory 100 side (corresponding to step S411). In step S605, the factory-side operation apparatus 130 receives information representing the operation condition of the industrial machine 110 from the management apparatus 120 (corresponding to step S411).

In step S606, the factory-side operation apparatus 130 analyzes the information received from the management apparatus 120 and outputs the result to the monitor 131 or the like.

In step S607, it is determined whether the operation of the industrial machine 110 is to be ended. If YES in step S607, the flow advances to step S609 to execute end processing (e.g., a command indicating the end of the operation is transmitted to the management apparatus 120).

According to the present invention, a method and system for operating an industrial machine from a remote site and checking the operation condition can be provided. These system and method can quickly and easily optimize the parameters of the industrial machine or solve any trouble in industrial machine.

As many apparently widely different embodiments of the present invention can be made without departing from the spirit and scope thereof, it is to be understood that the invention is not limited to the specific embodiments thereof except as defined in the appended claims.

What is claimed is:

1. A management system for managing an industrial machine using a data communication network, comprising:
   a management apparatus for selectively giving an operation right of the industrial machine to one of a first operation apparatus arranged in a factory where the industrial machine is installed and a second operation apparatus arranged at a remote site from the factory where the industrial machine is installed;
   a control apparatus for operating the industrial machine in accordance with an instruction from the operation apparatus to which the operation right has been given by said management apparatus and providing information representing an operation condition of the industrial machine to the operation apparatus; and
   a limiting section for limiting contents of operation of the industrial machine by the first operation apparatus through said control apparatus when a manager of the industrial machine is a manager of the second operation apparatus.

2. A management system for managing an industrial machine using a data communication network, comprising:
   a management apparatus for selectively giving an operation right of the industrial machine to one of a first operation apparatus arranged in a factory where the industrial machine is installed and a second operation apparatus arranged at a remote site from the factory where the industrial machine is installed;
   a control apparatus for operating the industrial machine in accordance with an instruction from the operation apparatus to which the operation right has been given by said management apparatus and providing information representing an operation condition of the industrial machine to the operation apparatus; and
   a limiting section for limiting contents of operation of the industrial machine by the second operation apparatus through said control apparatus when a manager of the industrial machine is a manager of the first operation apparatus.

3. A management system for managing an industrial machine using a data communication network, comprising:
   a management apparatus for selectively giving an operation right of the industrial machine to one of a first operation apparatus arranged in a factory where the industrial machine is installed and a second operation apparatus arranged at a remote site from the factory where the industrial machine is installed;
   a control apparatus for operating the industrial machine in accordance with an instruction from the operation apparatus to which the operation right has been given by said management apparatus and providing information representing an operation condition of the industrial machine to the operation apparatus; and
   a security system for making information related to the operation of the industrial machine by the first operation apparatus secret to the second operation apparatus and making information related to the operation of the industrial machine by the second operation apparatus secret to the first operation apparatus.

4. The system according to claim 3, wherein said security system makes some or all pieces of information, which are secret to the second operation apparatus, public to the second operation apparatus in accordance with an instruction from the first operation apparatus and makes some or all pieces of information, which are secret to the first operation apparatus, public to the first operation apparatus in accordance with an instruction from the second operation apparatus.

5. The system according to claim 4, wherein when the operation right of the industrial machine is given to the first operation apparatus, said security system makes the information representing the operation condition of the industrial machine public to the second operation apparatus in accordance with an instruction from the first operation apparatus, and when the operation right of the industrial machine is given to the second operation apparatus, said security system makes the information representing the
   operation condition of the industrial machine public to the first operation apparatus in accordance with an instruction from the second operation apparatus.

6. A management method of managing an industrial machine using a data communication network, comprising:
   a management step of selectively giving an operation right of the industrial machine to one of a first operation apparatus arranged in a factory where the industrial machine is installed and a second operation apparatus arranged at a remote site from the factory where the industrial machine is installed;
   a control step of sending an instruction from the operation apparatus to which the operation right has been given in the management step to a control apparatus of the industrial machine to cause the control apparatus to control the industrial machine and sending information representing an operation condition of the industrial machine from the control apparatus to the operation apparatus; and
   a limiting step of limiting contents of operation of the industrial machine by the first operation apparatus through the control apparatus when a manager of the industrial machine is a manager of the second operation apparatus.

7. A management method of managing an industrial machine using a data communication network, comprising:

a management step of selectively giving an operation right of the industrial machine to one of a first operation apparatus arranged in a factory where the industrial machine is installed and a second operation apparatus arranged at a remote site from the factory where the industrial machine is installed;

a control step of sending an instruction from the operation apparatus to which the operation right has been given in the management step to a control apparatus of the industrial machine to cause the control apparatus to control the industrial machine and sending information representing an operation condition of the industrial machine from the control apparatus to the operation apparatus; and a limiting step of limiting contents of operation of the industrial machine by the second operation apparatus through the control apparatus when a manager of the industrial machine is a manager of the first operation apparatus.

8. A management method of managing an industrial machine using a data communication network, comprising:

a management step of selectively giving an operation right of the industrial machine to one of a first operation apparatus arranged in a factory where the industrial machine is installed and a second operation apparatus arranged at a remote site from the factory where the industrial machine is installed;

a control step of sending an instruction from the operation apparatus to which the operation right has been given in the management step to a control apparatus of the industrial machine to cause the control apparatus to control the industrial machine and sending information representing an operation condition of the industrial machine from the control apparatus to the operation apparatus; and a security step of making information related to the operation of the industrial machine by the first operation apparatus secret to the second operation apparatus and making information related to the operation of the industrial machine by the second operation apparatus secret to the first operation apparatus.

9. The method according to claim 8, wherein in the security step, some or all pieces of information, which are secret to the second operation apparatus, are made public to the second operation apparatus in accordance with an instruction from the first operation apparatus, and some or all pieces of information, which are secret to the first operation apparatus, are made public to the first operation apparatus in accordance with an instruction from the second operation apparatus.

10. The method according to claim 9, wherein in the security step, when the operation right of the industrial machine is given to the first operation apparatus, the information representing the operation condition of the industrial machine is made public to the second operation apparatus in accordance with an instruction from the first operation apparatus, and when the operation right of the industrial machine is given to the second operation apparatus, the information representing the operation condition of the industrial machine is made public to the first operation apparatus in accordance with an instruction from the second operation apparatus.

* * * * *